United States Patent [19]

Nishida et al.

[11] 4,172,989
[45] Oct. 30, 1979

[54] SPEED CONTROL DEVICE FOR A SEWING MACHINE

[75] Inventors: Koji Nishida, Nagoya; Taneichi Kawai, Anjo; Shigemitsu Hamajima, Obu; Tsuneo Hida; Nobuyosi Nagura, both of Anjo, all of Japan

[73] Assignee: Aisin Seiki Kabushiki Kaisha, Kariya, Japan

[21] Appl. No.: 803,319

[22] Filed: Jun. 3, 1977

[30] Foreign Application Priority Data

Jun. 15, 1976 [JP] Japan .................... 51-69914

[51] Int. Cl.$^2$ ............................................ H02P 5/06
[52] U.S. Cl. ................................ 318/341; 318/314
[58] Field of Search ............... 318/314, 341, 345 G, 318/326

[56] References Cited

U.S. PATENT DOCUMENTS 3,792,330  2/1974  Ottoson ........................ 318/345 C
3,946,293  3/1976  Feld ............................... 318/314

*Primary Examiner*—Gene Z. Rubinson
*Assistant Examiner*—M. K. Muller
*Attorney, Agent, or Firm*—Finnegan, Henderson, Farabow & Garrett

[57] ABSTRACT

A speed control device for a sewing machine includes at least means for providing a speed reference voltage signal, means for producing a motor speed voltage signal responsive to an actual speed of the driving motor, and means for comparing the speed reference voltage signal with the motor speed voltage signal to provide a speed difference signal. The speed difference signal is utilized to determine triggering angle of a thyristor means for controlling the motor speed and to maintain the predetermined motor speed irrespective of any variation in the driving torque of the motor, the voltage of the power source and the frequency of the A.C. power source.

7 Claims, 16 Drawing Figures

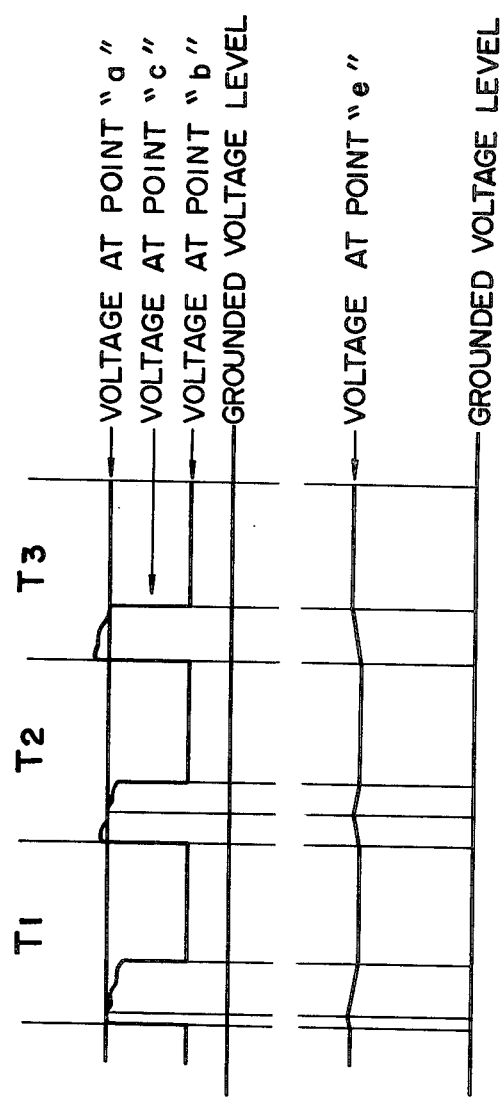

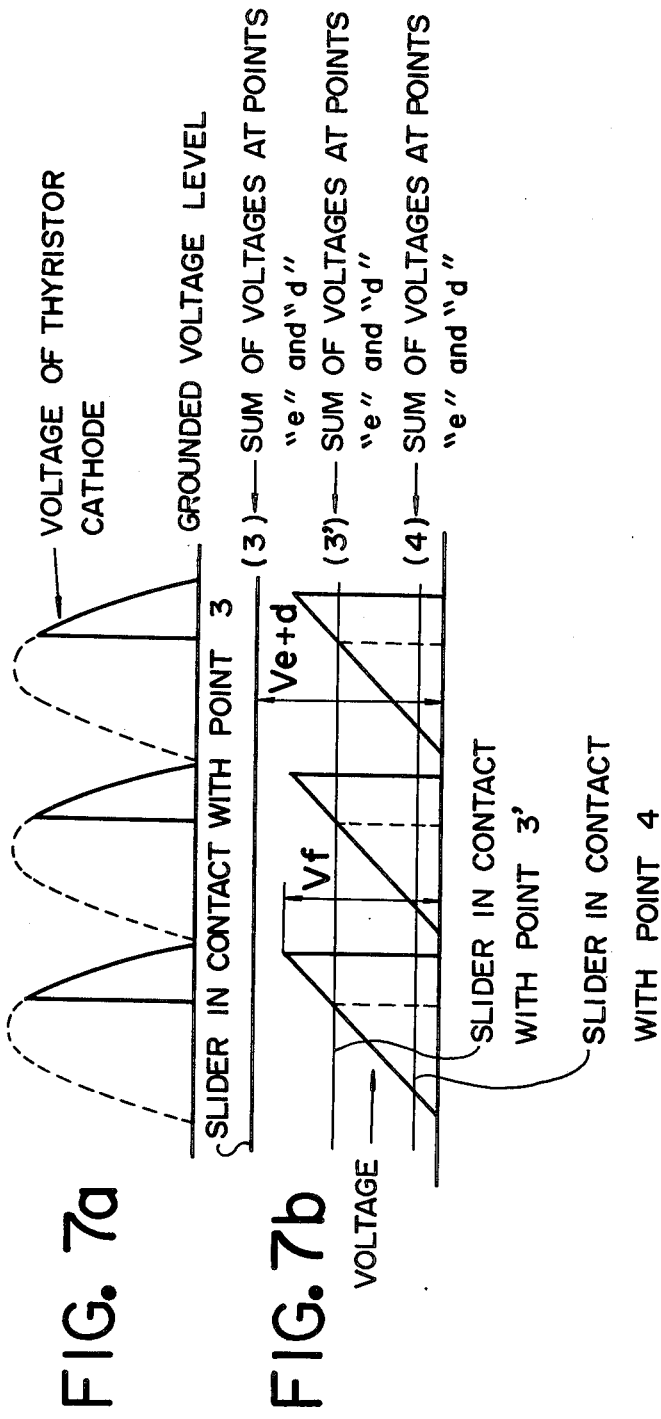

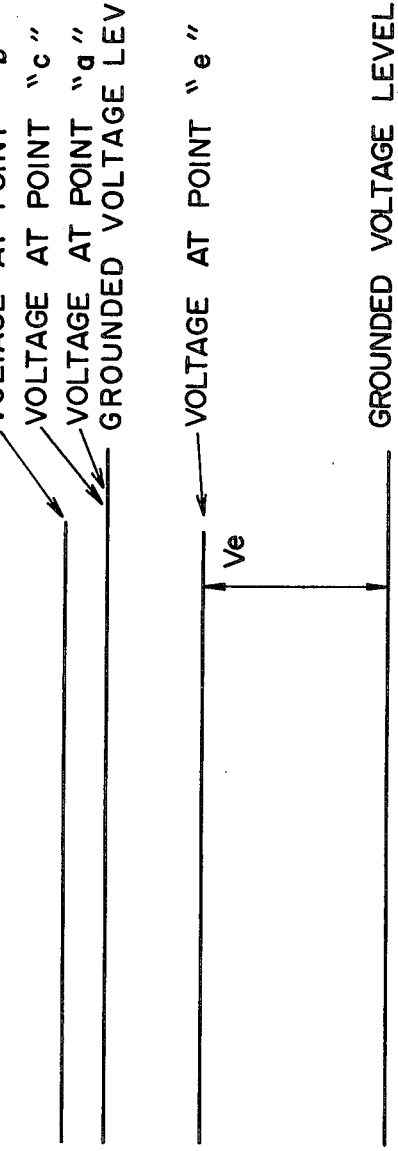

SPEED CONTROL DEVICE FOR A SEWING MACHINE

The present invention relates to motor-driven sewing machines and more particularly to speed control means for such sewing machines.

It has conventionally been known to employ thyristors for controlling the operating speed of driving motors of sewing machines. In such motor speed control devices, thyristors are disposed in the motor energizing circuit in such a manner that they allow electric current to pass through the circuit only after the thyristors are triggered. In order to provide electric pulses for triggering the thyristors, there are provided a capacitance circuit and a reference voltage circuit. The capacitance circuit is charged by an alternating current source and the output of the capacitance circuit is compared with the voltage of the reference circuit whereby, when the output voltage from the capacitance circuit is increased to a predetermined level with respect to the reference voltage, a trigger signal is produced and applied to the thyristor.

The speed of the driving motor is therefore a function of the time constant of the capacitance circuit. Under a small time constant, the trigger timing of the thyristor is advanced because the triggering voltage will be established with a smaller time interval. This will result in an increase in the motor speed. On the other hand, under a larger time constant, the motor speed will be decreased.

The known motor speed control device has been found disadvantageous in that it is difficult to determine as desired the relationship between the stroke of the manual control element and the motor speed so that skill has been required in controlling the speed of the driving motor during the sewing operation.

Further, in a feed-back arrangement in which the motor speed signal is fed back to the speed control circuit, it has been a usual practice to apply the speed signal voltage to the reference voltage but the arrangement is disadvantageous in that an adequate driving torque cannot be provided under a low speed operation.

The present invention has therefore an object to provide speed control means for sewing machines which can afford an adequate driving torque throughout the operating speed range.

Another object of the present invention is to provide speed control means for sewing machines in which the relationship between the stroke of the manual control element and the speed of the driving motor can be determined as desired.

A further object of the present invention is to provide speed control means for sewing machines in which the speed of the driving motor can be adjusted as desired without any skill.

According to the present invention, the above and other objects of the present invention can be accomplished, in a sewing machine including driving motor means provided with armature means and field coil means, and thyristor means connected between the field coil means and A.C. power source means, speed control means for the motor means comprising manually operated means, means responsive to said manual means for providing a speed reference voltage signal, means for providing a motor speed voltage signal which corresponds to an actual speed of the motor means, means for comparing the motor speed voltage signal with the speed reference signal to provide a speed difference signal, trigger angle determining circuit means connected with the comparing means to receive the speed difference signal therefrom to determine triggering angle of the thyristor means for controlling the motor speed, phase angle signal generating means for providing a signal which represents a phase angle of the A.C. power source means, phase angle comparing means for comparing the signal from the trigger angle determining circuit means with the signal from the phase angle signal generating means to provide a trigger signal, and trigger circuit means for triggering the thyristor means when the trigger signal is received from the phase angle comparing means.

According to the present invention, the speed reference voltage signal is provided through an actuation of the manually operated means, and the speed reference voltage signal is utilized to control the motor speed. Therefore, the motor speed control can be performed only through the actuation of the manually operated means such as a foot pedal. Further, it is possible to provide a driving torque up to the one that can be obtained when the whole available energy is applied from the power source to the motor. As far as the motor load is smaller than the available energy of the power source, the motor speed can be maintained constant irrespective of any variation in the voltage of the power source. The motor speed can also be maintained constant even if there is a change in the frequency of the A.C. power source.

The above and other objects and features of the present invention will become apparent from the following descriptions of a preferred embodiment taking reference to the accompanying drawings, in which;

FIG. 6a is a diagram showing the voltages at the points a, b and c in FIG. 1;

FIG. 6b is a diagram showing the voltage at the point e in FIG. 1;

FIG. 7a is a diagram showing the voltage at the output end of the thyristor;

FIG. 7b is a diagram showing the relationship between the voltage at the point f in FIG. 1 and the voltages at the points d and e;

FIG. 8a is a diagram showing the voltages at the points a, b and c when the manually operated element is released;

FIG. 8b is a diagram showing the voltage at the point e when the manually operated element is released;

Figure 1:
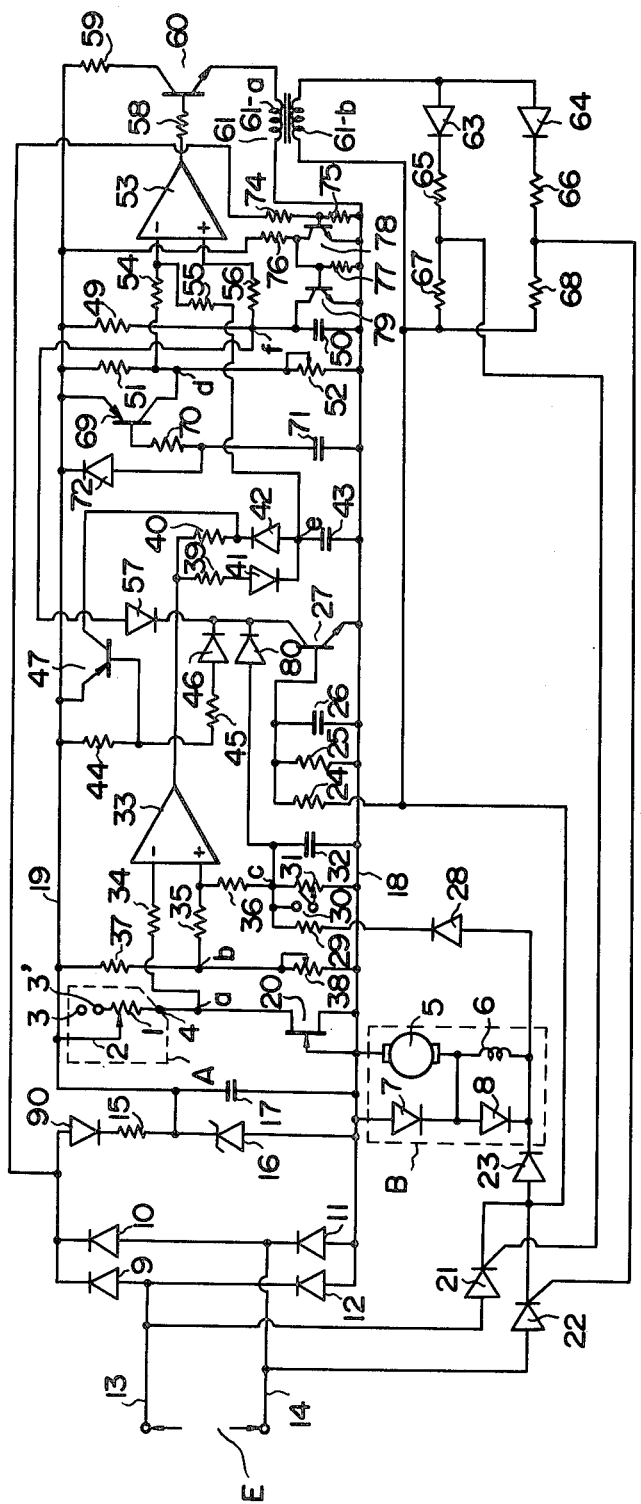
FIG. 1 is a circuit diagram showing the motor speed control means in accordance with one embodiment of the present invention.

Referring to the drawings, particularly to FIG. 1, the motor speed control device shown therein includes a variable resistor assembly A comprising a resistor 1 and a slider 2. The slider 2 is a manually operated element and may be connected with a foot pedal or a like member (not shown). The resistor 1 extends between opposite ends 3' and 4, and the resistor assembly A includes an open contact 3. When the foot pedal is released, the slider 2 rides on the open contact 3.

The device further includes a sewing machine driving motor B having an armature 5 and a field coil 6 which is connected in series with the armature 5. A diode 7 is connected in parallel with the armature 5 and a diode 8 is connected in parallel with the field coil 6. The diode 7 functions to discharge the reverse voltage which may be produced across the armature 5 when the power to the motor B is cut off. Similarly, the diode 8 functions to discharge the reverse voltage which may be produced across the field coil 6 when the power to the motor is cut off, and to maintain the field for a very short time interval.

A full wave rectifying circuit is provided by diodes 9, 10, 11 and 12. More precisely, the diode 12 has a cathode connected with the anode of the diode 9, while the cathode of the diode 9 is connected with the cathode of the diode 10. The anode of the diode 10 is connected with the cathode of the diode 11, and the anode of the diode 11 is connected with the anode of the diode 12. The anodes of the diodes 11 and 12 are connected with a reference or zero voltage line 18. An A.C. power source E is connected through lines 13 and 14 with the ends of the diode 9 and the cathode of the diode 11.

A constant voltage circuit is constituted by a diode 90, a resistor 15, a zenor diode 16 and capacitor 17. For the purpose, the anode of the diode 90 is connected with the cathode of the diode 10, while the cathode of the diode 90 is connected with one end of the resistor 15. The other end of the resistor 15 is connected with the cathode of the zenor diode 16, the anode of the zenor diode being connected with the line 18. The capacitor 17 is connected in parallel with the zenor diode 16. The cathode of the zenor diode 16 is connected with a line 19 for providing a constant voltage D thereto. The slider 2 of the variable resistor assembly A is connected with the line 19.

Figure 3A:
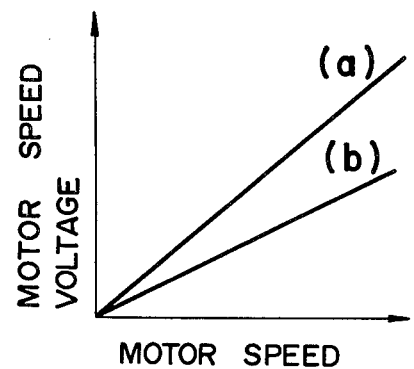
FIG. 3a is a diagram showing the relationship between the motor speed voltage signal and the motor speed.
Figure 3B:
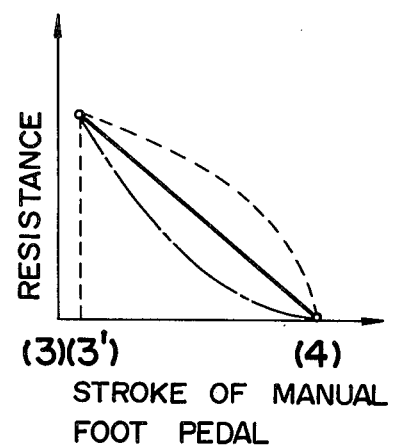
FIG. 3b is a diagram showing the change in the speed control register and the stroke of the manually operated element.
Figure 3C:
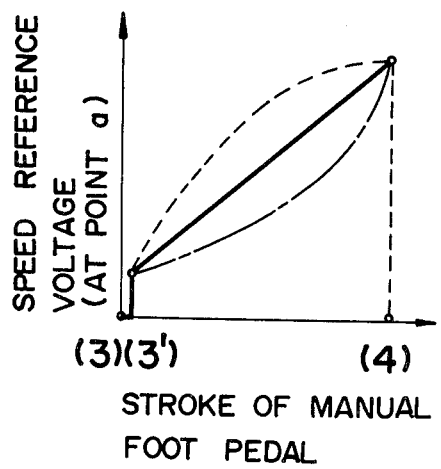
FIG. 3c is a diagram showing the relationship between the stroke of the manually operated element and the reference speed voltage signal.

A constant current source is provided by an N-type FET 20 which has a gate and a source both connected with the line 18. The drain of the FET 20 is connected with the end 4 of the resistor 1. Thus, it will be seen that, as the resistance of the resistor 1 varies in response to the movement of the slider 2 as shown in FIG. 3b, the voltage at the drain of the FET 20 or the point a changes as shown in FIG. 3c. Therefore, the voltage at the point a is proportional to the change in the resistance of the resistor 1. This voltage is utilized as the reference speed voltage signal.

In order to control the operation of the motor B, there is provided a thyristor 21 which has an anode connected with the line 13. There is also provided a further thyristor 22 of which anode is connected with the line 14. The cathodes of the thyristors 21 and 22 are both connected with the anode of a diode 23 which has a cathode connected with the field coil 6 of the motor B. The armature 5 of the motor B is connected with the line 18.

Figures 2, 4, 5, 9A, 9B:
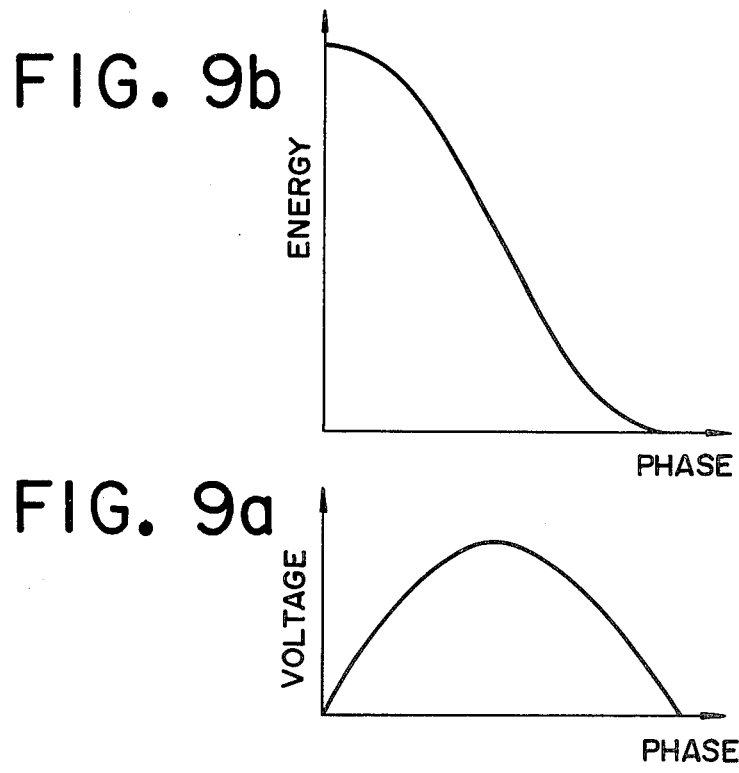
FIG. 2 shows a wave form of the voltage at the input end of the motor field coil.
FIG. 4 is a diagram showing the wave form at the output end of the thyristor.
FIG. 5 is a diagram showing the voltage at the point c in FIG. 1.
FIG. 9a shows the waveform of the source voltage.
FIG. 9b shows the change in the available energy.

The thyristors 21 and 22 have control gates to which control voltages are applied for making the thyristors conductive. Thus, by alternately applying the control voltage to the gates of the thyristors 21 and 22, the A.C. voltage from the power source E is applied to the diode 23 in the form as shown in FIG. 4. In FIG. 4, the voltage designated as (a) may be the one which has passed through the thyristor 21 and that designated as (b) may be the one which has passed through the thyristor 22. By controlling the timing of the control voltage, it is possible to control the speed of the motor B.

The voltage at the cathode of the diode 23 is shown in FIG. 2. Referring to FIGS. 2 and 4, it will be noted that the voltage at the cathode of the diode 23 is different from that at the anode in the time interval designated by e. This is due to the fact that, when the thyristor 21 or 22 is cut-off, the magnetic energy which has been stored in the field coil 6 of the motor B is discharged through the diode 8 to maintain a magnetic field making it possible that the motor B functions as a generator. The voltage at the cathode of the diode 23 is therefore proportional to the speed of the motor B.

The cathodes of the thyristors 21 and 22 are connected with a thyristor sensing circuit which comprises resistors 24 and 25, a capacitor 26 and an NPN type transistor 27. The resistor 24 is connected at one end with the anode of the diode 23 and at the other end with the resistor 25. Further, the capacitor 26 is connected in parallel with the resistor 25. The other end of the resistor 24 is also connected together with the resistor 25 and the capacitor 26 with the base of the transistor 27. The resistor 25 and the capacitor 26 are connected with the line 18. The emitter of the transistor 27 is also connected with the line 18. The collector of the transistor 27 is connected with the cathodes of the diodes 80, 46 and 57. Thus, it will be noted that when either of the thyristors 21 and 22 is conductive, the transistor 27 is also made conductive.

The cathode of the diode 23 is connected with a motor speed detecting circuit which comprises a diode 28, resistors 29 and 31, a capacitor 32 and a diode 80. The diode 28 has an anode connected with the cathode of the diode 23 and also has a cathode connected with one end of the resistor 29. The other end of the resistor 29 is connected with one end of the resistor 31, with one end of the capacitor 32 which is in parallel with the resistor 31, and with the anode of the diode 80. The other ends of the resistor 31 and the capacitor 32 are connected with the line 18. The resistors 29 and 31 and said one end of the capacitor 32 are connected with the anode of the diode 80.

Thus, it will be noted that the point c of junction between the resistors 29 and 31 and the capacitor 32 is connected through the diode 80 and the transistor 27 with the line 18 when either of the thyristors 21 and 22 is conductive. Therefore, at the point c, there only remains a voltage which corresponds to the voltage generated in the motor B when the thyristor is cut-off. Such voltage is shown in FIG. 5. The value of the voltage at the point c is thus proportional to the speed of the motor B as shown by a line (a) in FIG. 3(a). The slope of the line (a) can be varied as desired by varying the value of the resistor 31. For the purpose, the resistor 31 in this embodiment is in the form of a variable resistor having a slider. A switch 30 may also be provided between the slider of the variable resistor 31 and the point c to provide two different slopes of voltage change. In FIG. 3(a), the line a shows the change when the switch 30 is opened while the line (b) shows the change when the switch 30 is closed.

Between the lines 18 and 19, there is provided a voltage dividing circuit which comprises a resistor 37 and a variable resistor 38 which are connected together at a point b. The resistor 37 is connected with the line 19 while the resistor 38 is connected with the line 18. The voltage dividing circuit is provided in order to compensate for the voltage between the points a and c. The circuit is so adjusted that, when the slider 2 of the controller A is in contact with the open terminal 3 or, in other words, when the resistor 1 is disconnected from the line 19, the sum of the voltage at the point b and that at the point c is greater than the voltage at the point a but, when the slider 2 is in contact with the point 3', the former voltage is smaller than the latter voltage.

The point a is connected with a current input type analogue IC 33 at the negative input terminal thereof through a resistor 34. The points b and c are connected respectively through resistors 35 and 36 with the positive input terminal of the analogue IC 33. The analogue IC 33 functions to compare the input current at the negative input terminal with the input current at the positive input terminal and provide zero output when the former current is greater than the latter current and an output voltage V when the former current is smaller than the latter current.

The output of the analogue IC 33 is connected with a trigger angle command circuit which comprises resistors 39 and 40, diodes 41 and 42, a capacitor 43, resistors 44 and 45, a transistor 47 and a diode 46. The output of the analogue IC 33 is connected with the resistors 39 and 40. The other end of the resistor 39 is connected with the anode of the diode 41 while the other end of the resistor 40 is connected with the cathode of the diode 42. The anode of the diode 42 is connected with the cathode of the diode 41 and one end of the capacitor 43. The other end of the capacitor 43 is connected with the line 18. The anode of the diode 42 is connected with the collector of the PNP type transistor 47. The transistor 47 is further connected at the emitter with the line 19 and at the base with the resistors 44 and 45. The other end of the resistor 44 is connected with the line 19 while the other end of the resistor 45 is connected with the anode of the diode 46.

The trigger angle command circuit functions to determine the trigger angle of the thyristors 21 and 22 by controlling charge and discharge of the capacitor 43 in accordance with the output voltage of the analogue IC 33. When the speed command voltage at the point a is greater than the sum of the voltages at the points b and c, the analogue IC 33 provides a zero output whereby the electric charge in the capacitor 43 is discharged through the diode 42 decreasing the voltage across the capacitor 43.

When the speed command voltage is smaller than the sum of the voltages at the points b and c, an output voltage V is produced in the analogue IC 33 so that the capacitor 43 is charged through the resistor 39 and the diode 41 resulting in an increase in the voltage across the capacitor 43.

In the embodiment, separate circuits are provided for charging and discharging the capacitor for the purpose of providing different time constants for charging and discharging so that a smooth speed control can be effected throughout a wide range of load variations. The circuit comprising the transistor 47, the resistors 44 and 45, and the diode 46 is provided in order to prevent discharge of the capacitor 43 when either of the thyristors 21 and 22 is conductive so that the voltage generated in the motor B has disappeared and the output of the analogue IC 33 has therefore disappeared. When the thyristor 21 or 22 is conductive, the transistor 27 becomes conductive and therefore the PNP type transistor 47 becomes also conductive, so that the voltage in line 19 is applied to the cathode of the diode 42 to prevent discharge from the capacitor 43.

A phase angle signal generating circuit is provided by a diode 57, resistors 74 and 75, a transistor 78, resistors 76 and 77, a transistor 79, a resistor 49 and a capacitor 50. The resistor 74 is connected at one end with the cathode of the diode 10 and at the other end with the base of the NPN type transistor 78 and one end of the resistor 75. The other end of the resistor 75 is connected with the line 18. The transistor 78 is connected at the collector with the resistor 76 which is in turn connected with the line 19, and also with the resistor 77 which is in turn connected with the line 18. Further, the collector of the transistor 78 is also connected with the base of the NPN type transistor 79. The emitter of the transistor 78 is connected with the line 18.

The transistor 79 is connected at its collector with the anode of the diode 57 and also with the resistor 49 which is in turn connected with the line 19. Further, the collector of the transistor 79 is connected with the capacitor 50 which is in turn connected with the line 18. The emitter of the transistor 79 is connected with the line 18.

The phase angle signal generating circuit functions to produce a saw-tooth waveform which has a frequency corresponding to that of the A.C. power source as shown in FIG. 7. The saw-tooth shaped output voltage of the circuit decreases to zero voltage as soon as the thyristor 21 or 22 becomes conductive.

Resistors 51 and 52 constitute a voltage dividing circuit and are connected together at a point d. Further, the resistors 51 and 52 are respectively connected with the lines 19 and 18. The point d is connected through a resistor 54 with a current input type analogue IC 53 at its negative input terminal. The positive input terminal of the analogue IC 53 is connected with one end of a resistor 56, of which the other end is connected at a point f with the resistor 49, the capacitor 50, the collector of the transistor 79 and the anode of the diode 57. The negative input terminal of the analogue IC 53 is further connected with one end of a resistor 55, of which the other end is connected at a point e with the capacitor 43, the cathode of the diode 41 and the anode of the diode 42.

The analogue IC 53 functions to compare the inputs at the negative and positive input terminals and produces a zero voltage when the sum of the voltages at the points d and e is greater than the voltage at the point f but produces an output voltage V when the former is smaller than the latter voltage.

A trigger circuit is provided by resistors 58 and 59, an NPN type transistor 60, a pulse transformer 61, diodes 63 and 64, and resistors 65, 66, 67 and 68 for producing trigger pulses which are utilized for triggering the thyristors 21 and 22.

The resistor 58 is connected at one end with the output of the analogue IC 53 and at the other end with the base of the transistor 60.

The transistor 60 has a collector which is connected through a resistor 59 with the line 19. The emitter of the transistor 60 is connected through the primary coil 61a of the transformer 61 with the line 18. The secondary coil 61b of the transformer 61 is connected at one end with the anodes of the diodes 63 and 64 and at the other end with the resistors 67, 68 and 24 and the cathodes of the thyristors 21 and 22. The other end of the resistor 67 is connected with the gate of the thyristor 21 and also through the resistor 65 with the cathode of the diode 63. The other end of the resistor 68 is connected with the gate of the thyristor 22 and also through the resistor 66 with the cathode of the diode 64.

When the analogue IC 53 produces an output voltage V, the transistor 60 becomes conductive so that a current is supplied to the primary coil 61a of the transformer 61. Thus, an output current is produced in the secondary coil 61b of the transformer 61. The current is rectified by the diodes 63 and 64 and the voltages across the resistors 67 and 68 are applied to the gates of the thyristors 21 and 22, respectively, so as to trigger the thyristors.

As soon as the thyristor 21 and 22 becomes conductive in this manner, the transistor 27 becomes also conductive so that the voltage across the capacitor 50 is decreased to zero. Therefore, the output of the analogue IC 53 becomes zero to cut-off the transistor 60. In this manner, it is possible to prevent unnecessary current through the transformer 61.

In the aforementioned circuits, when the A.C. power source E is turned on, the rate of increase in the voltage at the point e is slower than that at the point f, so that there is a possibility that the analogue IC 53 produces an output voltage V which energizes the thyristor trigger circuit and causes the motor B to operate. In order to prevent the problem, there is provided a circuit which comprises a PNP type transistor 69, a resistor 70, a capacitor 71 and a diode 72.

The emitter of the transistor 69 is connected with the line 19 and the collector with the point d. The base of the transistor 69 is connected through the resistor 70 and the capacitor 71 with the line 18 and also through the resistor 70 with the anode of the diode 72. The cathode of the diode is connected with the line 19.

The latter circuit functions to maintain the voltage V at the point f for a time interval which corresponds to the time constant of the circuit including the resistor 70 and the capacitor 71, so as to prevent the operation of the motor when the power source is turned on until the voltage is adequately increased at the point e. The charge stored in the capacitor 71 is discharged through the diode 72 when the power source is turned off.

In operation, when the A.C. power source E is turned on but the controller A is not actuated so that the slider 2 is on the open contact 3, the voltage at the point a becomes zero because the resistance between the line 19 and the drain of the FET 20 is infinite. If the motor B is stationary in this instance, the voltage at the point c also becomes zero. If the motor B is running, the voltage at the point c corresponds to the motor speed. The voltage at the point b is adjusted by the variable resistor 38 in such a manner that the motor B runs at a minimum speed when the slider 2 is in contact with the point 3'. When the power source E is first turned on, the voltage at the point a is always smaller than the sum of the voltages at the points b and c irrespective of the operating condition of the motor. In FIG. 8a, there are shown the voltages at the points a, b and c.

Thus, at this time the analogue IC 33 always produces an output voltage V so that the capacitor 43 is always charged through the resistor 39 and the diode 41. After a predetermined time constant of the circuit including the resistor 39 and the capacitor 43, the voltage at the point e reaches the saturated voltage Ve which is substantially equal to the voltage V as shown in FIG. 8b.

Thus, the analogue IC 53 is supplied at its negative input terminal with a voltage Ve+d which is the sum of the saturated voltage Ve at the point e and the voltage at the point d. The positive input terminal of the analogue IC 53 is always supplied with a saw-teeth shaped voltage which is synchronous in phase with the A.C. power source. The resistor 49 and the capacitor 50 are so determined that the maximum value Vf of the saw-teeth shaped voltage is always smaller than the input voltage Ve+d at the negative input terminal as shown in FIG. 7b.

In this manner, the output of the analogue IC 53 is always at the zero voltage so that the transformer 61 is not energized, as long as the slider 2 of the controller A is on the contact 3. The thyristors 21 and 22 are therefore maintained in the cut-off position so that the motor is maintained stationary.

When the controller is actuated until the slider 2 is in contact with the resistor 1, the voltage at the point a changes in accordance with the resistance R of the resistor 1 as shown in FIG. 3c. With the slider 2 in contact with the point 3', the voltage $V_{3'}$ is produced at the point a. The variable resistor 38 is so adjusted that the voltage $V_{3'}$ is greater than that at the point b. Since the motor is stationary the voltage at the point c is at the zero level. Therefore, the voltage at the point a is greater than the sum of the voltages at the points b and c. The output of the analogue IC 33 is therefore at the zero level. The charge in the capacitor 43 is therefore discharged through the diode 42 and the resistor 40 resulting in a gradual decrease of the voltage at the point e.

The sum of the voltages at the points d and e is also gradually decreased to the line 3' in FIG. 7b so that there are time intervals wherein the voltage at the point f is greater than the sum of the voltages at the points d and e. As soon as the voltage at the point f becomes greater than the voltage sum of d and e, the analogue IC 53 produces the output voltage V so that the transformer 61 is energized to apply trigger signals to the thyristers 21 and 22. The thyristors 21 and 22 are thus triggered alternately and supply the source voltage to the motor B until the source voltage decreases to the zero level.

As the motor B starts to rotate, there is produced at the point c a voltage which is corresponding to the motor speed. Where the motor speed is lower than the desired value and the sum of the voltages at the points b and c is smaller than the voltage at the point a as shown in the region $T_1$ in FIG. 6, the charge in the capacitor 43 is discharged with the result that the voltage at the point e and therefore the sum of the voltages at the points e and d are correspondingly decreased. Thus, the trigger timing of the thyristors 21 and 22 is advanced so that the motor B is supplied with the source voltage for a longer period. The motor speed is therefore increased until the sum of the voltages at the points b and c is balanced with the voltage at the point a as shown in the region $T_2$ in FIG. 6 and thus the voltage at the point e is stabilized.

In FIG. 7, there is shown the sum of the voltages at the points e and d in this instance as well as the operations of the thyristors 21 and 22. It will be noted in FIG. 7 that the sum of the voltages at the points e and d is decreased as the slider 2 in the controller A is moved from the open contact 3 to the end point 3' of the resistor 1.

It should be noted that, in the illustrated circuit, it is impossible to produce a voltage representing the motor speed when the thyristor 21 or 22 is in conductive condition. Therefore, means is provided for maintaining the voltage at the point e as shown in FIG. 6b in time intervals wherein the motor speed voltage cannot be produced. More specifically, as soon as either of the thyristors 21 and 22 becomes conductive, the transistor 27 is also made conductive to decrease the voltage at the point c to the zero level. As the result, the output of the analogue IC 33 is also decreased to the zero level to prevent charging of the capacitor 43. At the same time, the transistor 47 becomes conductive so that the cathode of the diode 42 is applied with the voltage V to prevent discharge of the capacitor 43.

Once the thyristor 21 or 22 is switched on or made conductive, it is no longer necessary to continuously supply a current to the pulse transformer 61. Therefore, as soon as the thyristor 21 or 22 is triggered, the transistor 27 is turned into the conductive state to have the charge in the capacitor 50 discharged until the voltage at the point f is decreased to the zero level. Thus, the output from the analogue IC 53 is decreased to the zero level to terminate the supply of current to the pulse transformer 61. When the slider 2 in the controller A is in contact with the point 3', the sum of the voltages at the points e and d is at the level shown by 3' in FIG. 7 so that the voltage at the point f becomes the zero level at the timings shown by dotted lines in the figure.

As the slider 2 is gradually advanced along the resistor 1, the voltage at the point a is gradually increased as shown in FIG. 3c. Thus, the balanced relationship among the voltages at the points a, c and e is broken and the voltage at the point a becomes greater than the sum of the voltages at the points b and c as shown in the region T₁ in FIG. 6.

The output of the analogue IC 33 is thus decreased to have the capacitor 43 discharged. As the result, the voltage at the point e is decreased and therefore the sum of the voltages at the points e and d is also decreased. The trigger timing of the thyristors is therefore advanced resulting in an increase in the motor speed. As the motor speed increases, the voltage at the point c is correspondingly increased and the motor speed is stabilized at the value wherein the sum of the voltages at the points b and c is balanced with the voltage at the point a as shown in FIG. 6.

When the slider 2 is moved along the resistor 1 toward the point 3', the voltage at the point a is gradually decreased as shown in FIG. 3c. Therefore, the voltage at the point a becomes smaller than the sum of the voltages at the points b and c as shown in the region T₃ in FIG. 6. The analogue IC 33 thus produces an output voltage V which is utilized to charge the capacitor 43. Therefore, the voltage at the point e and thus the sum of the voltages at the points e and d are correspondingly increased with the result that the trigger timing of the thyristors 21 and 22 is retarded to decrease the motor speed. The voltage at the point c is therefore decreased until the sum of the voltages at the points b and c is balanced with the voltage at the point a as shown in the region T₂ in FIG. 6.

Figure 3D:
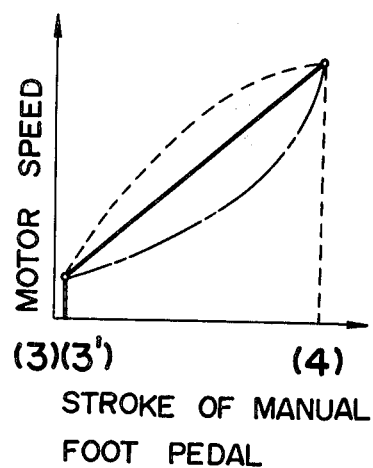
FIG. 3d is a diagram showing the relationship between the stroke of the manually operated element and the motor speed.

Thus, it will be understood that, in the illustrated circuit, the trigger timing of the thyristors is automatically controlled so that the sum of the voltages at the points b and c is balanced with the voltage at the point a to attain a desired motor speed. Since the voltage at the point c is proportional to the motor speed as shown in FIG. 3a, the motor speed is also proportional to the voltage at the point a. Further, the change of the resistance value in the variable resistor A is proportional to the voltage at the point a, so that it is possible to establish a relationship between the amount of actuation of the manual control member and the motor speed as shown in FIG. 3d.

When the motor is running at a constant speed under a certain load, the voltages at the points a, b, c and e are balanced as shown in the region T₂ in FIG. 6. When the load on the motor B is increased under this condition, there will be a decrease in the motor speed so that the voltage at the point c is correspondingly decreased. Thus, the aforementioned balance among the voltages is broken as shown in the region T₁ in FIG. 6 with the result that the voltage at the point e is decreased to advance the thyristor trigger timing. Therefore, the motor speed is recovered to the value corresponding to the voltage at the point a.

When the load on the motor is excessively heavy so that the motor speed cannot be recovered to the value corresponding to the voltage at the point a, the voltage at the point e is decreased to the zero level and the thyristor trigger timing is fully advanced so that the source voltage is fully supplied to the motor. Thus, it will be understood that a fully rated torque is available irrespective of the motor speed.

When the load on the motor is decreased, there will be an increase in the motor speed so that the voltage at the point c is correspondingly increased. Therefore, the voltage at the point e is also increased to have the thyristor trigger timing retarded until the motor speed is decreased to the value corresponding to the voltage at the point a.

The illustrated circuit further includes a safety device comprising a transistor 69, a resistor 70, a capacitor 71 and a diode 72. In the circuit, there is a possibility that, when the A.C. power source is turned on, the motor is undesirably started due to the fact that the time constant of the capacitor 43 is greater than that of the capacitor 50. When A.C. power source E is turned with the slider 2 in contact with the open contact 3, the analogue IC 33 produces an output voltage V so that the capacitors 43 and 50 are charged. If the capacitors 43 and 50 are fully charged, the sum of the voltages at the points e and d is always greater than the voltage at the point f so that the motor B will not be started. However, in the course of charging the capacitors 43 and 50, there may be an instance wherein the voltage at the point f is greater than the voltages at the points e and d due to the difference in the charging time constants of the capacitors. In order to prevent this problem, the transistor 69 is made conductive for a time interval which is determined by the time constant of the RC circuit including the resistor 70 and the capacitor 71, so that the voltage V is maintained at the point d and therefore the sum of the voltages at the points e and d is greater than the voltage at the point f. The diode 72 functions to have the charge of the capacitor 71 discharged as soon as the A.C. power source E is turned off.

From the above descriptions, it will be understood that the various abjects of the present invention can be accomplished by the circuit illustrated and described. Although the invention has thus been shown and described with reference to a specific embodiment, it should be noted that the invention is in no way limited to the details of the illustrated arrangements but changes and modifications may be made without departing from the scope of the appended claims.

What is claimed is:

1. A speed control device for a sewing machine including driving motor means provided with armature means and field coil means, and thyristor means connected between the field coil means and an A.C. power source, the speed control device comprising:

manually operated means, means responsive to said manual means for providing a speed reference voltage signal, means for providing a motor speed voltage signal which corresponds to the actual speed of the motor means, means for comparing the motor speed voltage signal with the speed reference signal to provide a speed difference voltage signal, trigger angle determining circuit means including a capacitor and means for controlling the charging and discharging of the capacitor as a function of the speed difference signal and to determine therefrom the triggering angle of the thyristor means as a function of the charge on the capacitor, said circuit means providing a signal of a direct current voltage in accordance with the determined triggering angle, phase angle signal generating means for providing a signal of voltage level of saw-tooth wave form synchronized with a phase angle of the A.C. power source, phase angle comparing means for producing a trigger signal when the signal of the trigger angle determining circuit means is equal in voltage to the signal of the phase angle signal generating means, and trigger circuit means for triggering the thyristor means to control the motor speed when the trigger signal is received from the phase angle comparing means.

2. A speed control device in accordance with claim 1 in which said speed reference voltage signal providing means includes variable resistor means having a variable resistance and means for establishing a voltage corresponding to the resistance of the variable resistor means.

3. A speed control device in accordance with claim 1 which further includes means for preventing unwanted energization of the driving motor means when the A.C. power source means is first turned on.

4. A speed control device in accordance with claim 1 in which said motor speed voltage signal means includes means for establishing a voltage corresponding to motor speed and means for providing a constant voltage which is adapted to be summed with the former voltage.

5. A speed control device in accordance with claim 4 in which said constant voltage means includes adjustable resistor means.

6. A speed control device in accordance with claim 1 in which said trigger angle determining circuit means also includes means for preventing the capacitor from being discharged when the thyristor means is conductive, and means for preventing the capacitor from being charged when a low voltage level is provided in the output of the speed voltage comparing means.

7. A speed control device in accordance with claim 1 also including means for varying the voltage across the capacitor independent of the speed reference voltage signal.

* * * * *